US012806858B2

(12) United States Patent
Liu et al.

(10) Patent No.: US 12,806,858 B2
(45) Date of Patent: Nov. 24, 2026

(54) EXTRUSION DEVICE AND 3D PRINTING DEVICE

(71) Applicant: SHENZHEN CREALITY 3D TECHNOLOGY CO., LTD., Shenzhen (CN)

(72) Inventors: Huilin Liu, Shenzhen (CN); Dajiang Wu, Shenzhen (CN)

(73) Assignee: SHENZHEN CREALITY 3D TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/212,292

(22) Filed: May 19, 2025

(65) Prior Publication Data

US 2026/0145383 A1 May 28, 2026

Related U.S. Application Data

(63) Continuation of application No. PCT/CN2023/127082, filed on Oct. 27, 2023.

(30) Foreign Application Priority Data

Nov. 30, 2022 (CN) ......................... 202211518973.5

(51) Int. Cl.
*B29C 64/209* (2017.01)
*B29C 64/118* (2017.01)
*B33Y 30/00* (2015.01)

(52) U.S. Cl.
CPC .......... *B29C 64/209* (2017.08); *B29C 64/118* (2017.08); *B33Y 30/00* (2014.12)

(58) Field of Classification Search
None
See application file for complete search history.

(56) References Cited

U.S. PATENT DOCUMENTS

2021/0308946 A1* 10/2021 Bondéus ............... B29C 64/321

FOREIGN PATENT DOCUMENTS

CN 204431740 U 7/2015
CN 109366994 A 2/2019
(Continued)

OTHER PUBLICATIONS

International Search Report issued for International Patent Application No. PCT/CN2023/127082, Date of mailing: Dec. 8, 2023, 5 pages including English translation.
(Continued)

*Primary Examiner* — Virak Nguon
(74) *Attorney, Agent, or Firm* — HSML P.C.

(57) ABSTRACT

An extrusion apparatus and a 3D printing device are provided. The extrusion device includes an extrusion assembly, a driving assembly, and a switching mechanism. The extrusion assembly includes a first extrusion wheel and a second extrusion wheel. A feeding gap allowing a consumable to pass through is formed between the first extrusion wheel and the second extrusion wheel. The driving assembly is in transmission connection with the extrusion assembly and configured to drive the first extrusion wheel and the second extrusion wheel to rotate in opposite directions. The switching mechanism includes a positioning assembly and a toggle member rotatably connected to the positioning assembly. The toggle member is configured to be operably rotated to switch between an open position and a closed position to drive the second extrusion wheel to approach or move away from the first extrusion wheel, so as to reduce or increase the feeding gap.

12 Claims, 9 Drawing Sheets

10

(56) References Cited

FOREIGN PATENT DOCUMENTS

| | | | | |
|---|---|---|---|---|
| CN | 112606387 | A | | 4/2021 |
| CN | 112659558 | A | | 4/2021 |
| CN | 113492525 | A | | 10/2021 |
| CN | 216068717 | U | | 3/2022 |
| CN | 115214137 | A | | 10/2022 |
| CN | 217862802 | U | * | 11/2022 |
| CN | 115782172 | A | | 3/2023 |
| JP | 2007102909 | A | | 4/2007 |
| WO | 2022160380 | A1 | | 8/2022 |

OTHER PUBLICATIONS

Written Opinion issued for International Patent Application No. PCT/CN2023/127082, Date of mailing: Dec. 8, 2023, 6 pages including English machine translation.

Extended European Search Report issued for European Patent Application No. 23896354.0, dated Mar. 27, 2026, 9 pages.

* cited by examiner

EXTRUSION DEVICE AND 3D PRINTING DEVICE

CROSS-REFERENCE TO RELATED APPLICATIONS

This application is a continuation of international PCT application serial no. PCT/CN 2023/127082, filed on Oct. 27, 2023, which claims the priority benefit of China application no. 202211518973.5, filed on Nov. 30, 2022. The entirety of each of the above-mentioned patent applications is hereby incorporated by reference herein and made a part of this specification.

TECHNICAL FIELD

The present disclosure relates to the field of 3D printing technology, in particular to an extrusion device and 3D printing device.

BACKGROUND

In 3D printing devices, extrusion devices are usually used to extrude filamentary consumable.

In the related art, the extrusion device includes a spring and two extrusion wheels, and the spring presses one of the extrusion wheels by its own elastic force, so that the two extrusion wheels engage and extrude materials. When feeding or replacing material is required, an operator needs to overcome the pressing force of the spring to enable one extrusion wheel to move away from the other extrusion wheel, so as to increase an axial distance between the two extrusion wheels, thereby performing the material feeding operation or material replacing operation.

Since the spring is easily deformed when compressed for a long time, which affects the stability of the extrusion force between the two extrusion wheels, there is a problem of low reliability in use.

SUMMARY

Accordingly, it is necessary to provide an extrusion device for solving a problem of low reliability in use of conventional extrusion devices.

An extrusion device configured to convey a 3D printing consumable includes:

- an extrusion assembly including a first extrusion wheel and a second extrusion wheel, wherein a feeding gap allowing a consumable to pass through is formed between the first extrusion wheel and the second extrusion wheel;
- a driving assembly in transmission connection with the extrusion assembly and configured to drive the first extrusion wheel and the second extrusion wheel to rotate in opposite directions; and
- a switching mechanism including a positioning assembly and a toggle member rotatably connected to the positioning assembly, wherein the first extrusion wheel is mounted on the positioning assembly, the second extrusion wheel is mounted on the toggle member, the toggle member has an open position and a closed position, the toggle member is configured to be operably rotated to switch between the open position and the closed position to drive the second extrusion wheel to approach or move away from the first extrusion wheel, so as to reduce or increase the feeding gap.

In one embodiment, the toggle member includes a first limiting portion, the positioning assembly includes a first connecting member located in the first limiting portion, during rotation of the toggle member relative to the positioning assembly, the first connecting member moves in the first limiting portion.

In one embodiment, the first extrusion wheel is mounted on the first connecting member, the second extrusion wheel is mounted on a mounting shaft of the toggle member, when the toggle member is located in the closed position, the mounting shaft and the first connecting member are collinear in a horizontal direction.

In one embodiment, one of the positioning assembly and the toggle member includes a second limiting portion, another one of the positioning assembly and the toggle member includes a second connecting member located in the second limiting portion, during the rotation of the toggle member relative to the positioning assembly, the second connecting member moves in the second limiting portion.

In one embodiment, the first limiting portion is a first sliding groove, the second limiting portion is a second sliding groove, and an angle is formed between an extending direction of the first sliding groove and an extending direction of the sliding groove.

In one embodiment, the first sliding groove and the second sliding groove are located at both ends of the toggle member, and the first sliding groove and the second sliding groove are not collinear in both a horizontal direction and a vertical direction.

In one embodiment, the positioning assembly includes a first locking portion, the toggle member includes two second locking portions that are spaced apart, when the toggle member rotates to the open position, the first locking portion is engaged with one of the two second locking portions; and when the toggle member is rotated to the closed position, the first locking portion is engaged with another of the two second limiting portions.

In one embodiment, one of the first locking portion and the second locking portion is a bead positioning pin, another one of the first locking portion and the second locking portion is a first positioning hole, and the bead positioning pin is engaged with the first positioning hole.

In one embodiment, the positioning assembly includes a fixing base and a positioning plate provided on the fixing base, the toggle member is located between the positioning plate and the fixing base and is rotatably connected to the positioning plate, and the first limiting portion is provided on the fixing base.

In one embodiment, the first extrusion wheel and the second extrusion wheel each includes a first main body wheel and a second main body wheel that are coaxially connected, two first main body wheels are engaged for transmission, one of the two first main body wheels is connected to the driving assembly, the feeding gap is formed between two second main body wheels, and the second main body wheel is driven to rotate by the corresponding first main body wheel.

In one embodiment, the driving assembly includes a driving member and a driving gear connected to the driving member, the driving member is configured to drive the driving gear to rotate, the extrusion device further includes a transmission wheel, the transmission wheel includes a third main body wheel and a fourth main body wheel that are coaxially connected, the third main body wheel is engaged with the driving gear for transmission, a number of teeth of the third main body wheel is greater than a number of teeth of the driving gear, and the fourth main body wheel is engaged with the first main body wheel for transmission.

A 3D printing device includes the aforementioned extrusion device.

The technical solution has the following beneficial effects: the extrusion device includes the extrusion assembly, the driving assembly, and the switching mechanism, and the extrusion assembly includes the first extrusion wheel and the second extrusion wheel. The switching mechanism includes the positioning assembly and the toggle member rotatably connected to the positioning assembly, the first extrusion wheel is mounted on the positioning assembly, and the second extrusion wheel is mounted on the positioning assembly. By rotating the toggle member, the second extrusion wheel mounted on the toggle member approaches or moves away from the first extrusion wheel, so as to change the size of the feeding gap between the first extrusion wheel and the second extrusion wheel. When the toggle member is operated to move to the open position, the second extrusion wheel moves away from the first extrusion wheel, the feeding gap between the second extrusion wheel and the first extrusion wheel is increased, thereby realizing the replacement or feeding of the consumable. When the toggle member is operated to move to the closed position, the second extrusion wheel approaches the first extrusion wheel, and the feeding gap between the second extrusion wheel and the first extrusion wheel is reduced, so that the consumable is extruded and conveyed, and the consumable is replaced more conveniently and efficiently. There is no need to provide a spring pressing extrusion wheel, so that the problem that the extrusion force between the two extrusion wheels is changed due to the deformation of the spring can be avoided, the extrusion force provided by the two extrusion wheels is relatively stable and reliable, the risk of material planing and material breakage is reduced, and the material conveying reliability and use stability of the extrusion device are improved.

Figure 1:
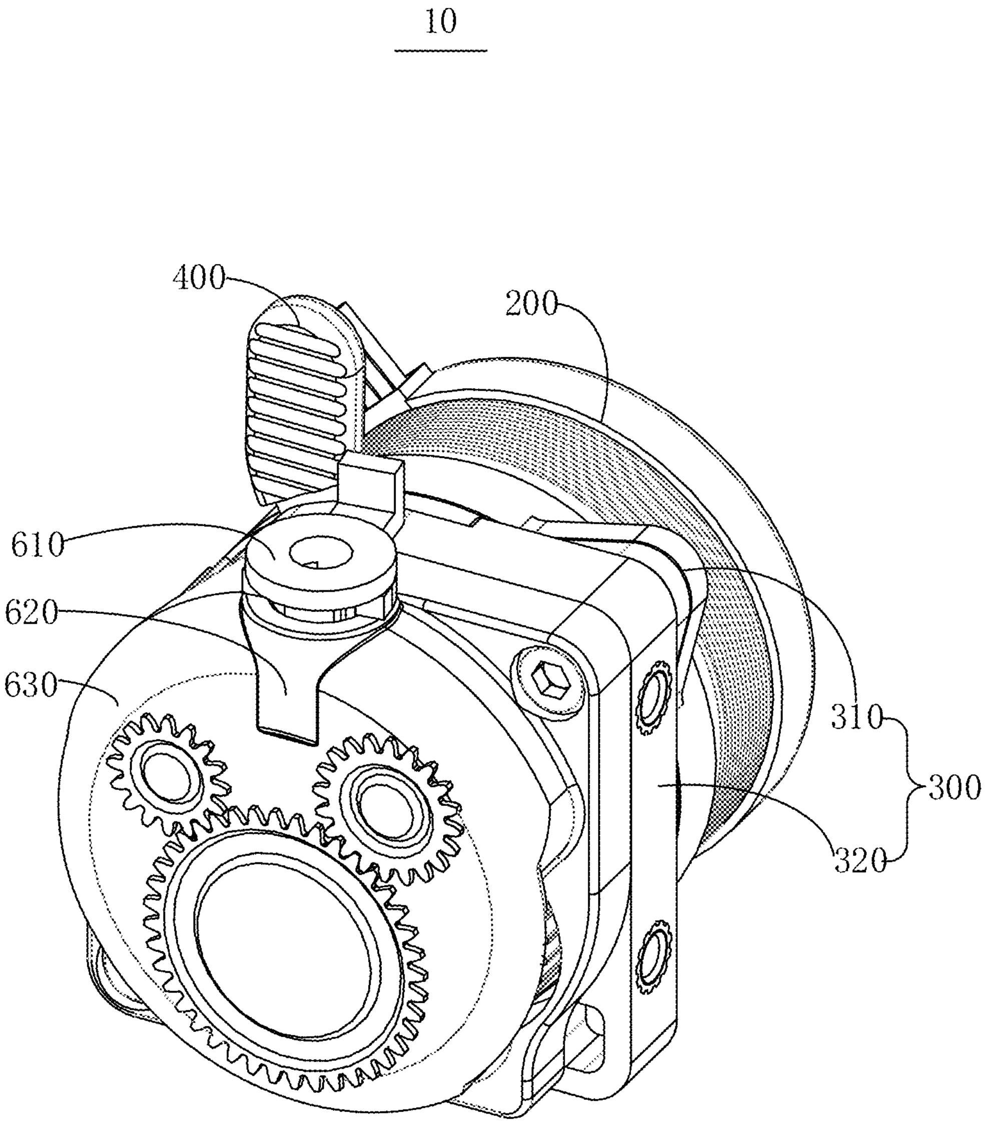
FIG. 1 is a perspective view of an extrusion device according to an embodiment of the present disclosure.

Reference numerals: 10, extrusion device; 100, extrusion assembly; 110, first extrusion wheel; 120, second extrusion wheel; 121, first main body wheel; 122, second main body wheel; 130, feeding gap;

200, driving assembly; 210, driving member; 220, driving gear;

300, positioning assembly; 310, positioning plate; 311, second connecting member; 312, first connecting member; 313, rotating shaft; 320, fixing base; 321, first limiting portion; 3211, bead positioning pin; 322, avoidance groove; 323, limiting column; 330, second avoidance gap;

400, toggle member; 410, second limiting portion; 411, second sliding groove; 420, second locking portion; 421, first positioning hole; 430, first limiting portion; 431, first sliding groove; 450, mounting shaft; 460, handle; 470, first avoidance notch;

500, transmission wheel; 510, third main body wheel; 520, fourth main body wheel;

610, claw; 620, buckle; 630, cover; 631, guide hole;

700, bearing.

DETAILED DESCRIPTION OF THE EMBODIMENTS

In order to make the above objectives, features and advantages of the present disclosure clear and easier to understand, the specific embodiments of the present disclosure are described in detail below in combination with the accompanying drawings. Many specific details are set forth in the following description to facilitate a full understanding of the present disclosure. However, the present disclosure can be implemented in many ways different from those described herein, and those skilled in the art can make similar improvements without departing from the connotation of the present disclosure. Therefore, the present disclosure is not limited by the specific embodiments disclosed below.

In the description of the present disclosure, it should be understood that the terms “center”, “longitudinal”, “transverse”, “length”, “width”, “thickness”, “upper”, “lower”, “front”, “rear”, “left”, “right”, “vertical”, “horizontal”, “top”, “bottom”, “inner”, “outer”, “clockwise”, “counterclockwise”, “axial”, “radial”, “circumferential direction” are based on the azimuths or position relationships shown in the attached drawings. These terms are only for the convenience of describing the present disclosure and simplifying the description, rather than indicating or implying that the indicated devices or elements must have the specific azimuths, or be constructed or operated in the specific azimuths, and therefore such terms cannot be understood as limitations of the present disclosure.

In addition, the terms “first” and “second” are only used for descriptive purposes and cannot be understood as indicating or implying relative importance or implicitly indicating the number of indicated technical features. Thus, the features defined with “first” and “second” may explicitly or implicitly include at least one of the features. In the description of the present disclosure, “a plurality of” means at least two, such as two, three, etc., unless otherwise expressly and specifically defined.

In the present disclosure, unless otherwise expressly specified and limited, the terms “mount”, “connect”, “couple”, “fix” and the like should be interpreted broadly. For example, the terms can mean fixed connection, detachable connection, or being integrated. The terms can mean mechanical connection or electrical connection. The terms can mean directly connection or indirectly connection through an intermediate medium. The terms can mean connection within two elements or interaction relationship between two elements, unless otherwise expressly limited.

For those skilled in the art, the specific meaning of the above terms in the present disclosure should be understood according to the specific situation.

In the present disclosure, unless otherwise expressly specified and limited, a first feature "above" or "below" a second feature may be in direct contact with the second feature, or the first and second features may be in indirect contact through an intermediate medium. Moreover, the first feature "above" the second feature may be right above or obliquely above the second feature, or the first feature may be merely located at a height higher than the second feature. The first feature "below" the second feature may be right below or obliquely below the second feature, or the first feature may be merely located at a height lower than that of the second feature.

It should be noted that when an element is called "fixed to" or "mounted on" another element, it can be directly on another element or there can be an intermediate element. When an element is considered to be "connected" to another element, it can be directly connected to another element or there can be an intermediate element. The terms "vertical", "horizontal", "up", "down", "left", "right" and similar expressions used herein are for the purpose of illustration only and do not represent the only ways for implementation.

As shown in FIGS. 1 to 6, an embodiment of the present disclosure provides an extrusion device 10 configured to convey a 3D printing consumable. The extrusion device 10 includes an extrusion assembly 100, a driving assembly 200, and a switching mechanism. The extrusion assembly 100 includes a first extrusion wheel 110 and a second extrusion wheel 120, and a feeding gap 130 allowing a consumable (not shown) to pass through is formed between the first extrusion wheel 110 and the second extrusion wheel 120. The driving assembly 200 is in transmission connection with the extrusion assembly 100 and configured to drive the first extrusion wheel 110 and the second extrusion wheel 120 to rotate in opposite directions. The switching mechanism includes a positioning assembly 300 and a toggle member 400 rotatably connected to the positioning assembly 300. The first extrusion wheel 110 is mounted on the positioning assembly 300. The second extrusion wheel 120 is mounted on the toggle member 400. The toggle member 400 has an open position and a closed position. The toggle member 400 is configured to be operably rotated to switch between the open position and the closed position to drive the second extrusion wheel 120 to approach or move away from the first extrusion wheel 110, so as to reduce or increase the feeding gap 130.

The two extrusion wheels 110, 120 are radially recessed to form extrusion grooves, and the two extrusion grooves form the feeding gap 130. The consumable is sandwiched between the first extrusion wheel 110 and the second extrusion wheel 120. When the consumable needs to be replaced, the toggle member 400 is operated to move to the open position, so that the second extrusion wheel 120 moves away from the first extrusion wheel 110, the feeding gap 130 between the two extrusion wheels 110, 120 is increased, and two extrusion wheels 110, 120 no longer extrude the consumable, thereby realizing the replacement or feeding of the consumable. When the toggle member 400 is operated to move to the closed position, the second extrusion wheel 120 approaches the first extrusion wheel 110, and the feeding gap 130 between the second extrusion wheel 120 and the first extrusion wheel 110 is reduced, so that the consumable is extruded and conveyed, and the consumable is replaced more conveniently and efficiently. There is no need to provide a spring pressing extrusion wheel, so that the problem that the extrusion force between the two extrusion wheels 110, 120 is changed due to the deformation of the spring can be avoided, the extrusion force provided by the two extrusion wheels 110, 120 is relatively stable and reliable, the risk of material planing and material breakage is reduced, and the material conveying reliability and use stability of the extrusion device 10 are improved. It should be understood that the first extrusion wheel 110 and the second extrusion wheel 120 may be gears or rubber wheels, the toggle member 400 may be a toggle plate, and the positioning assembly 300 may be a positioning plate.

Figure 4:
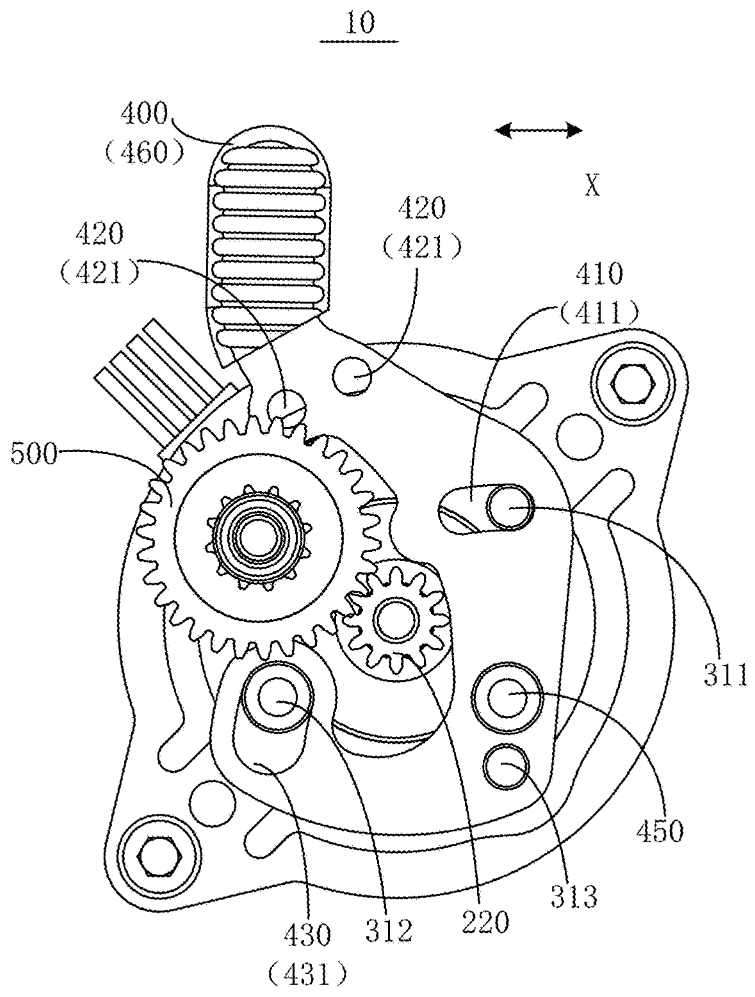
FIG. 4 is a front view of the extrusion device of FIG. 1 in a closed position.
Figure 6:
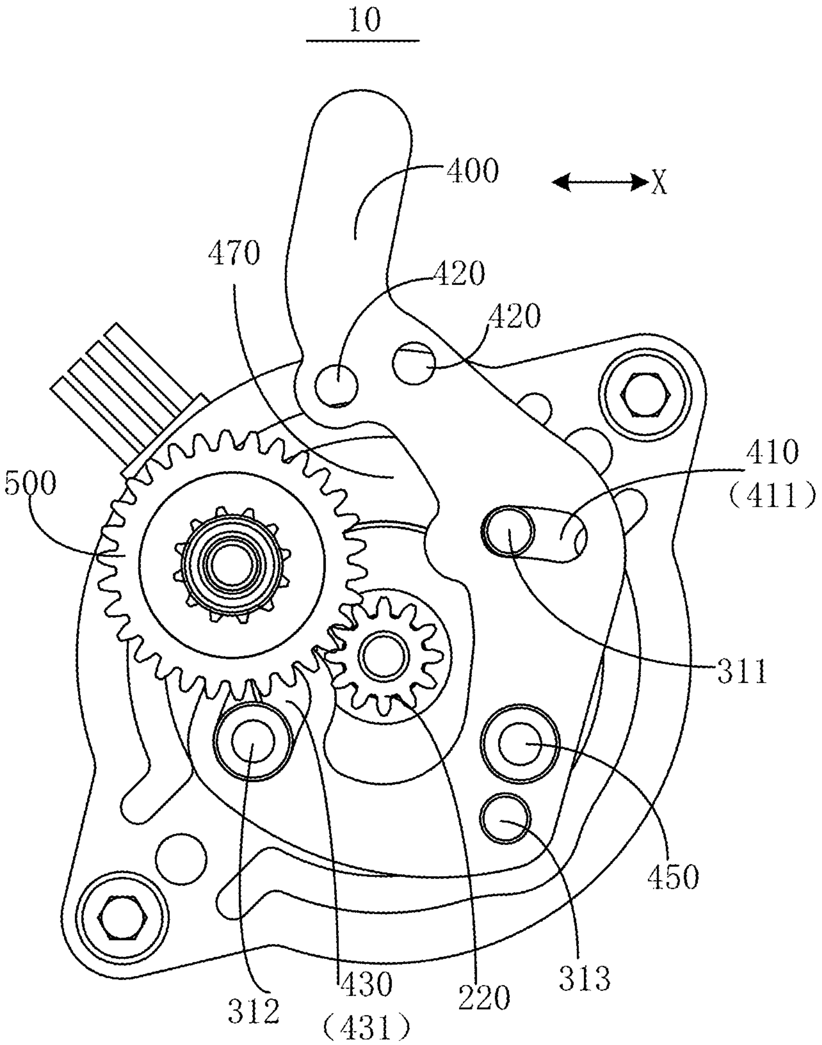
FIG. 6 is a front view of the extrusion device shown in FIG. 4 in an open position.
Figure 7:
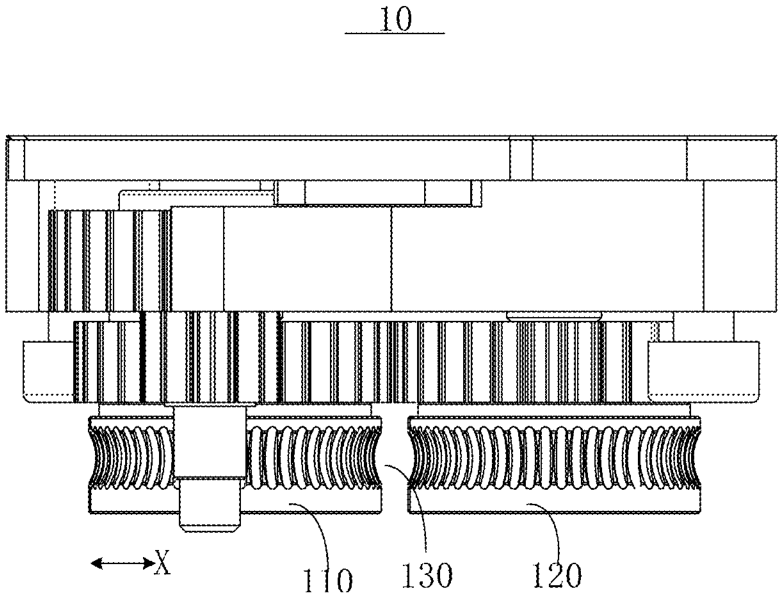
FIG. 7 is a top view of the extrusion device shown in FIG. 6 in the open position.
Figure 8:
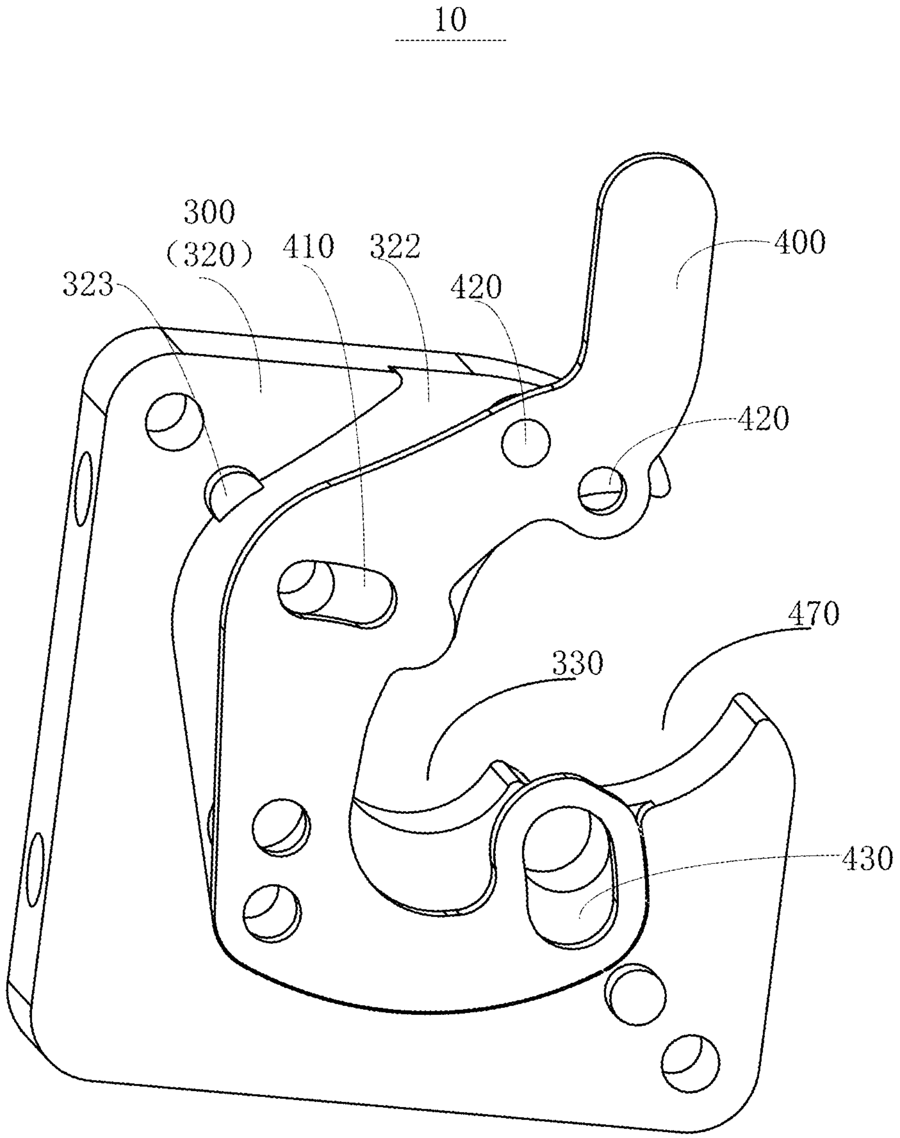
FIG. 8 is an enlarged perspective view of the extrusion device shown in FIG. 2.

As shown in FIG. 4, FIG. 6 and FIG. 8, in an embodiment, the toggle member 400 includes a first limiting portion 430. The positioning assembly 300 includes a first connecting member 312. The first connecting member 312 is located in the first limiting portion 430. During the rotation of the toggle member 400 relative to the positioning assembly 300, the first connecting member 312 moves in the first limiting portion 430.

Specifically, the first connecting member 312 is provided on the positioning assembly 300. The first limiting portion 430 is provided on the toggle member 400. The first connecting member 312 is configured to move in the first limiting portion 430 to adapt to the rotation of the toggle member 400, so that the toggle member 400 has a certain movement space and can rotate to a certain degree, thereby being able to switch between the open position and the closed position.

It should be understood that the arrangement positions of the first connecting member 312 and the first limiting portion 430 may be interchanged, that is, the first connecting member 312 is provided on the toggle member 400, and the first limiting portion 430 is provided on the positioning assembly 300. During rotation of the toggle member 400, the first connecting member 312 moves in the first limiting portion 430.

Figure 2:
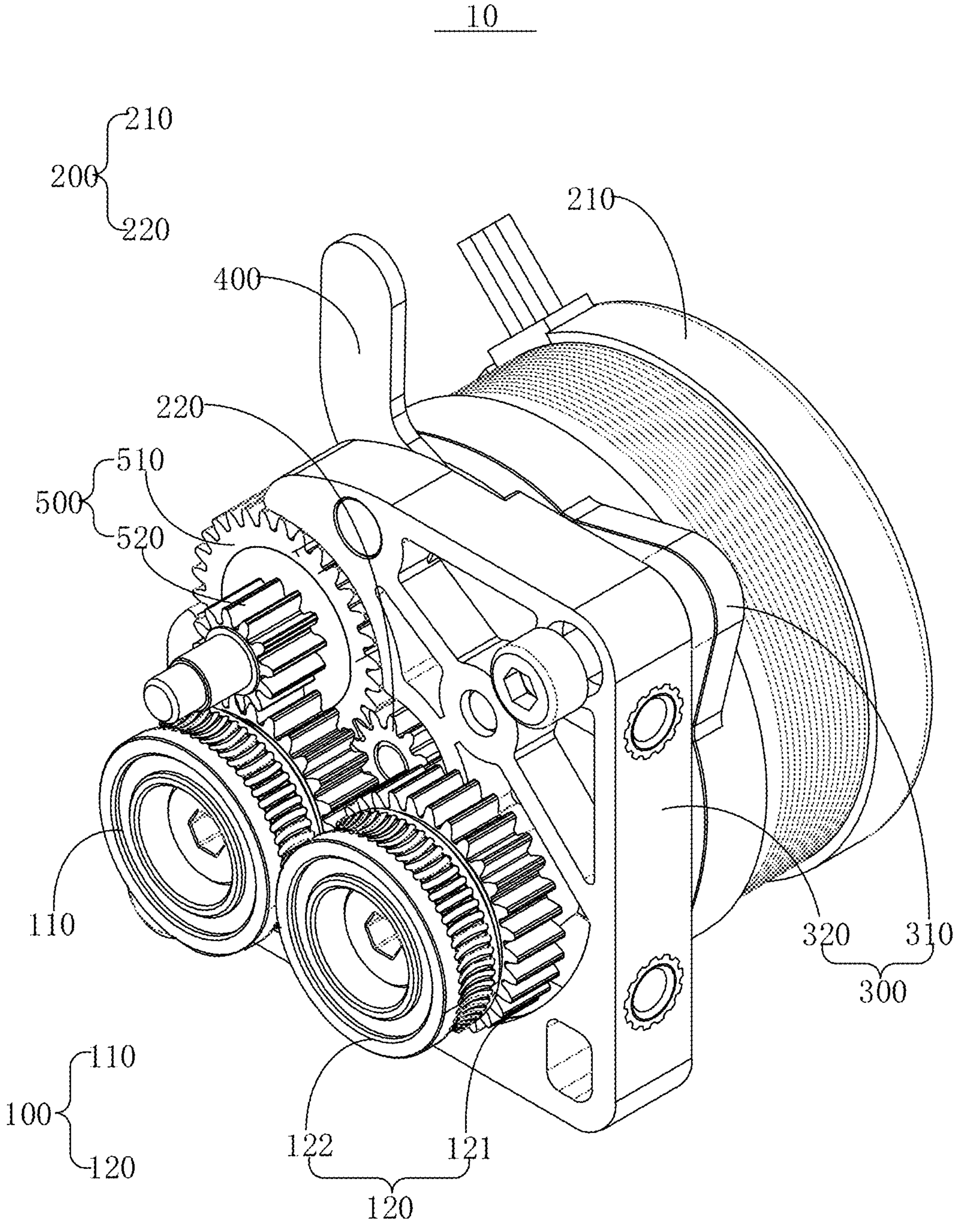
FIG. 2 is a perspective view of the extrusion device shown in FIG. 1 with a cover omitted.
Figure 3:
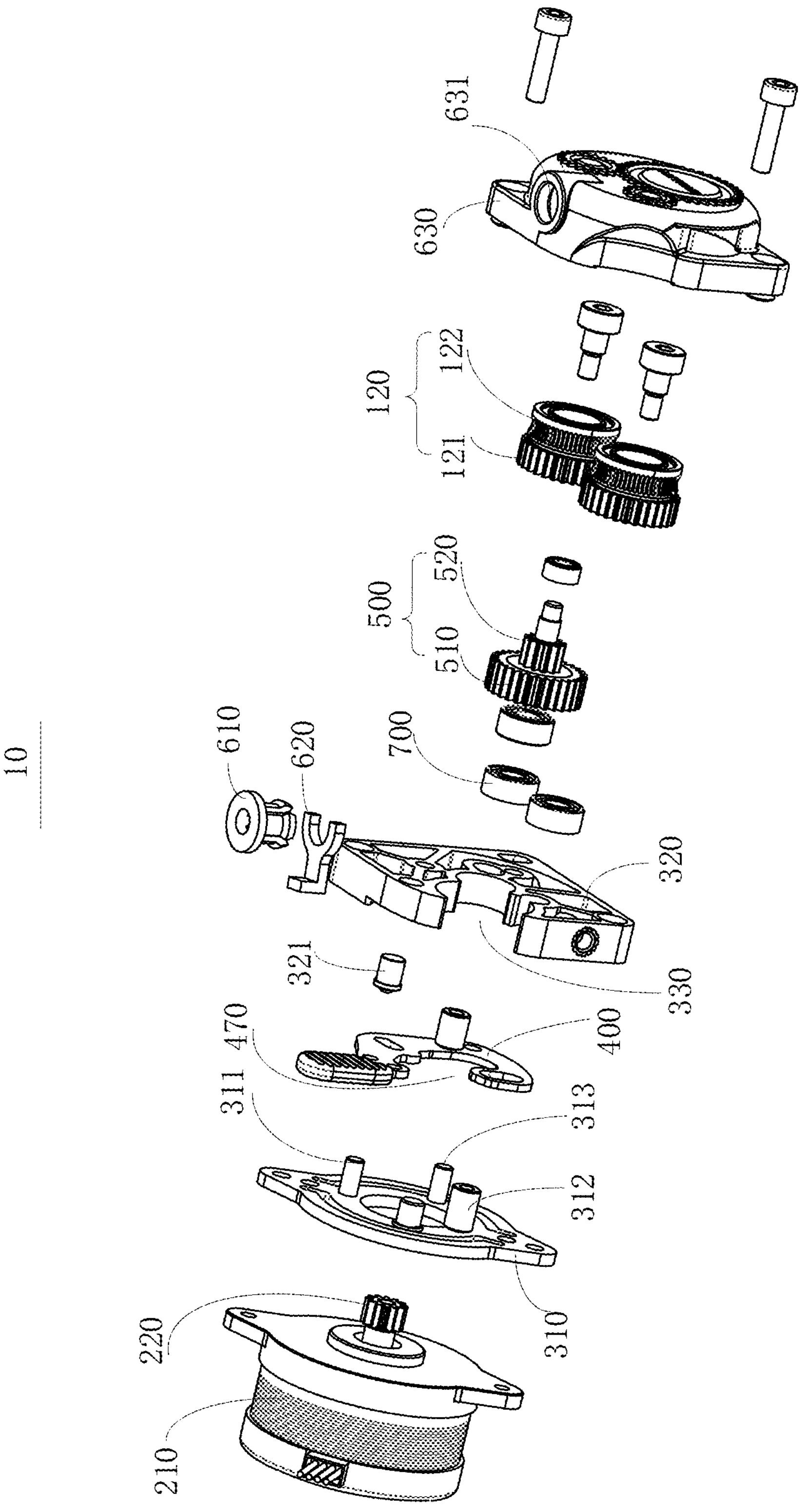
FIG. 3 is an exploded view of the extrusion device shown in FIG. 1.

As shown in FIG. 2 to FIG. 4, in an embodiment, the first connecting member 312 is provided on the positioning assembly 300, and the first limiting portion 430 is provided on the toggle member 400. The first extrusion wheel 110 is mounted on the first connecting member 312. The second extrusion wheel 120 is mounted on a mounting shaft 450 of the toggle member 400. When the toggle member 400 is located in the closed position, the mounting shaft 450 and the first connecting member 312 are collinear in a horizontal direction, i.e., an X direction in the drawing. It should be understood that the horizontal direction is perpendicular to axial directions of the two extrusion wheels 110, 120.

As shown in FIG. 4, when the consumable is clamped between the two extrusion wheels 110, 120, the consumable applies a first force horizontally to the right to the second extrusion wheel 120, and the first force is transmitted to the mounting shaft 450, i.e., the toggle member 400, through the second extrusion wheel 120. At the same time, the consumable applies a second force equal to and opposite to the first force to the first extrusion wheel 110. The second force is applied to the first limiting portion 430, i.e., the toggle member 400, through the second connecting member 312 on which the first extrusion wheel 110 is mounted. Since the mounting shaft 450 is collinear with the first connecting member 312 along the X direction, that is, the directions of the first force and the second force acting on the toggle member 400 are opposite, the first force and the second force can counteract each other, that is, the resultant force of the consumable acting on the toggle member 400 is zero, thereby preventing the second extrusion wheel 120 from being spread apart by the consumable and causing a distance between axles of the first extrusion wheel 110 and the second extrusion wheel 120 to be enlarged.

Figure 5:
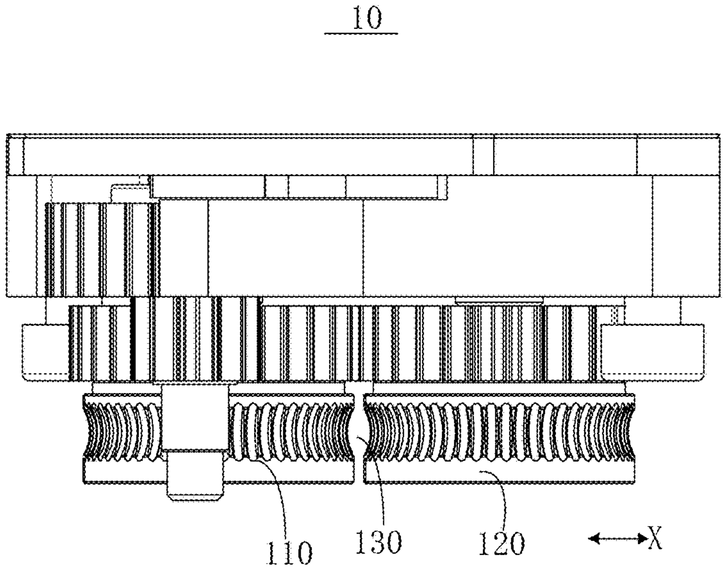
FIG. 5 is a top view of the extrusion device shown in FIG. 4 in a closed position.

As shown in FIGS. 4 to 6, in an embodiment, one of the positioning assembly 300 and the toggle member 400 includes a second limiting portion 410, and the other one of the positioning assembly 300 and the toggle member 400 includes a second connecting member 311. The second connecting member 311 is located in the second limiting portion 410. During the rotation of the toggle member 400 relative to the positioning assembly 300, the connecting member 311 moves in the second limiting portion 410.

Specifically, as shown in FIG. 3 and FIG. 4, the second connecting member 311 is provided on the positioning assembly 300. The second limiting portion 410 is provided on the toggle member 400. The positioning assembly 300 includes a rotating shaft 313, and the toggle member 400 rotates around the rotating shaft 313. During the rotation of the toggle member 400, a motion trajectory of the toggle member 400 is an arc-shaped trajectory. The second connecting member 311 is configured to move in the second limiting portion 410 to adapt to the rotation of the toggle member 400, so that the toggle member 400 has a certain movement space and can rotate to a certain degree, thereby being able to switch between the open position and the closed position.

As shown in FIG. 3 and FIG. 4, in still another embodiment, the first connecting member 312 is a first pin shaft, and the first limiting portion 430 is a first sliding groove 431. The second connecting member 311 is a second pin shaft, the second limiting portion 410 is a second sliding groove 411, and an angle is formed between an extending direction of the first sliding groove 431 and an extending direction of the second sliding groove 411.

Specifically, the extending direction of the first sliding groove 431 forms an angle with the horizontal direction (i.e., the X direction). For example, the first limiting portion 430 extends along a vertical direction perpendicular to the horizontal direction. The second sliding groove 411 extends in the horizontal direction in the figure, that is, in the X direction. A width of the first sliding groove 431 is slightly greater than a shaft diameter of the first pin shaft, and a width of the second sliding groove 411 is slightly greater than a shaft diameter of the second pin shaft, so as to ensure that the first pin shaft and the second pin shaft have a certain movement space.

When the toggle member 400 rotates around the rotating shaft 313, a displacement of the toggle member 400 can be divided into a displacement component in the horizontal direction and a displacement component in the vertical direction. The second connecting member 311 moves in the second sliding groove 411 extending horizontally, so as to adapt to the displacement component of the toggle member 400 in the horizontal direction. The first connecting member 312 moves in the first sliding groove 431, so as to adapt to the displacement component of the toggle member 400 in the vertical direction, thereby ensuring that the rotation of the toggle member 400 is not limited. It should be understood that when both the second sliding groove 411 and the first sliding groove 431 are provided on the toggle member 400, a groove width of the sliding groove can be adapted to a shaft diameter of the corresponding connecting member. When the second sliding groove 411 or the first sliding groove 431 is provided separately, the groove width of the sliding groove is greater than the shaft diameter of the connecting member to ensure that it can generate displacement components in both the horizontal direction and the vertical direction.

In other embodiments, the second limiting portion 410 may also be a circular hole. When the toggle member 400 rotates, the circular hole is configured to allow the second connecting member 311 to move.

It should be understood that the arrangement positions of the second connecting member 311 and the second limiting portion 410 may be interchanged, that is, the second connecting member 311 is provided on the toggle member 400, and the second limiting portion 410 is provided on the positioning assembly 300. During rotation of the toggle member 400, the second connecting member 311 moves in the second limiting portion 410.

As shown in FIG. 3 and FIG. 4, in an embodiment, the first sliding groove 431 and the second sliding groove 411 are located at both ends of the toggle member 400, and the first sliding groove 431 and the second sliding groove 411 are not collinear in both the horizontal direction and the vertical direction.

Through this arrangement, a distance between the first sliding groove 431 and the second sliding groove 411 is increased, that is, the distribution positions of the first sliding groove 431 and the second sliding groove 411 are more balanced. The possibility of limiting the rotation of the toggle member 400 due to the two sliding grooves being arranged at positions close to each other is reduced, thereby improving the smoothness of the rotation of the toggle member 400. Specifically, taking the toggle member 400 as a rectangular plate as an example, the second sliding groove 411 and the first sliding groove 431 are approximately located at diagonal positions of the rectangular plate. When the toggle member 400 is a circular plate, the second sliding groove 411 and the first sliding groove 431 may be located at both ends of the circular plate in a radial direction thereof.

Figure 9:
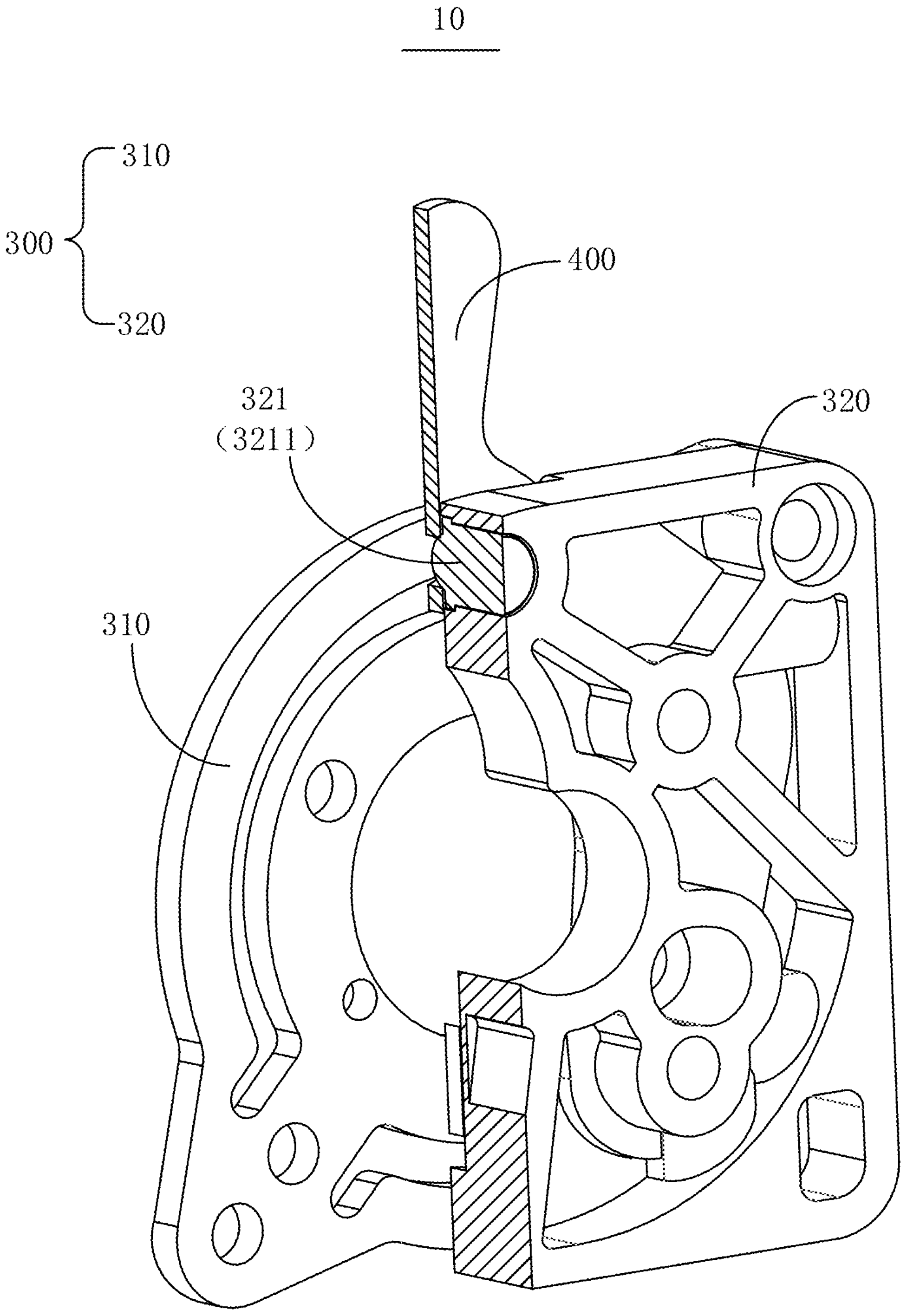
FIG. 9 is a partial sectional view of the extrusion device shown in FIG. 2.
Figure 10:
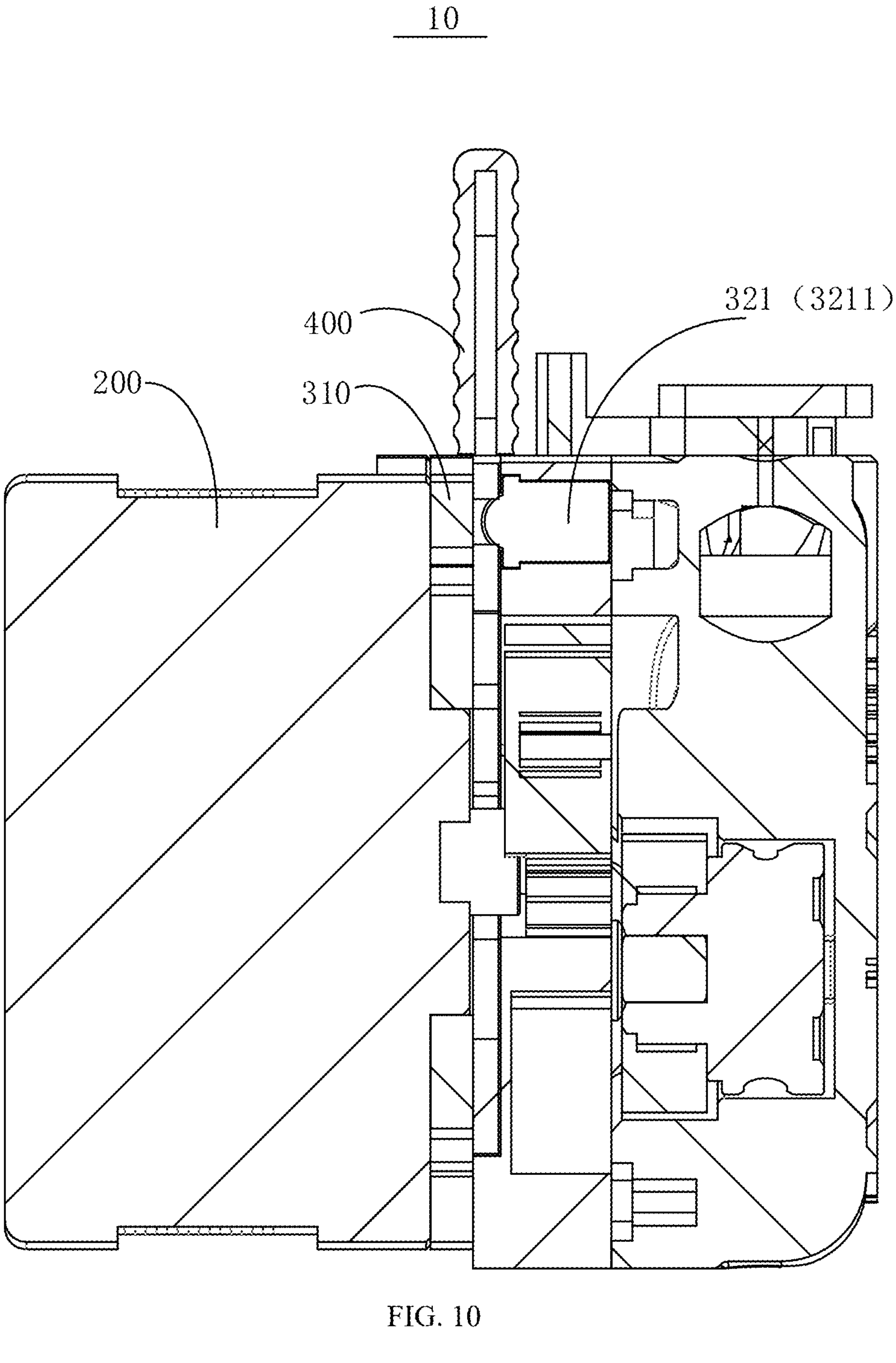
FIG. 10 is a sectional view of the extrusion device shown in FIG. 1.

As shown in FIGS. 8 to 10, in an embodiment, the positioning assembly 300 includes a first locking portion 321. The toggle member 400 includes two second locking portions 420 that are spaced apart, which correspond to the open position and the closed position, respectively. As shown in FIG. 6, when the toggle member 400 rotates to the open position, the first locking portion 321 is engaged with one of the two second locking portions 420. As shown in FIG. 4, when the toggle member 400 rotates to the closed position, the first locking portion 321 is engaged with the other one of the two second locking portions 420.

When the toggle member 400 moves to the open position or the closed position, the toggle member 400 is locked in the current position through the cooperation of the first locking portion 321 and the second locking portion 420, so as to reduce the possibility that the distance between the axles of the two extruding wheels is changed due to the extrusion force of the consumable on the two extrusion wheels 110, 120, and ensure the reliability of the toggle member 400 in the current position, thereby ensuring the stability of the material replacing operation or the material conveying operation. In addition, after the toggle member 400 is moved in place, the first limiting portion 321 and the second limiting portion 420 are engaged with each other, so that an operator only needs to operate the toggle member 400 in the process of position switching without manual action on the toggle member 400 until the replacement of consumable is completed, and the operator only needs to operate with one hand to easily realize the switching of the opening position and the closed position to improve the user's operation experience.

The positions of the two second locking portions 420 may be adjacent to the operation position of the toggle member 400, so that when the operator operates the toggle member 400 to rotate, the positions of the two second locking portions 420 change synchronously. It should be understood that, since the rotation track of the toggle member 400 is arc-shaped, the distribution positions of the two second locking portions 420 should also be located on one circular track. The arrangement position of the first locking portion 321 corresponds to the position of the second locking portion 420, so that the first locking portion 321 and the second locking portion 420 can be engaged with each other.

As shown in FIG. 8 to FIG. 10, in an optional embodiment, one of the first locking portion 321 and the second locking portion 420 is a bead positioning pin 3211, the other one of the first locking portion 321 and the second locking portion 420 is a first positioning hole 421, and the bead positioning pin 3211 is engaged with the first positioning hole 421.

Specifically, in this embodiment, the first locking portion 321 is the bead positioning pin 3211, and the bead positioning pin 3211 is provided on the positioning assembly 300. The second locking portion 420 is the first positioning hole 421, and the first positioning hole 421 is provided on the toggle member 400. Correspondingly, two first positioning holes 421 are provided, which are correspond to the open position and the closed position, respectively, and are configured to allow the bead positioning pin 3211 to extend into, so as to lock the position of the toggle member 400, ensure the reliability of the toggle member 400 in the current position, and further ensure the stability of the material replacing operation or the material conveying operation.

It should be understood that, in other embodiments, the first locking portion 321 may be a first positioning hole 421, and the second locking portion 420 may be a bead positioning pin 3211. Correspondingly, two bead positioning pin 3211*s* are provided, so that when the bead positioning pin 3211*s* are rotated to different positions, the bead positioning pin 3211 at the corresponding position may be engaged with the first positioning hole 421.

In another embodiment, one of the first locking portion 321 and the second locking portion 420 is a hook, and the other has a clamping groove for the hook to extend through. For example, the first locking portion 321 is a clamping groove formed on the positioning assembly 300. The second locking portion 420 is a hook. Two hooks are provided, and the two hooks are provided on the toggle member 400. When the toggle member 400 rotates to the open position or the closed position, the operator operates the hook to extend through the clamping groove. Since the position of the positioning assembly 300 is fixed, the position of the toggle member 400 is locked through the cooperation of the hook and the clamping groove.

As shown in FIG. 2 and FIG. 3, in an embodiment, the first extrusion wheel 110 and the second extrusion wheel 120 each includes a first main body wheel 121 and a second main body wheel 122 that are coaxially connected. Two first main body wheels 121 are engaged for transmission, and one of the two first main body wheels 121 is connected to the driving assembly 200. The feeding gap 130 is formed between two second main body wheels 122, and the second main body wheel 122 is driven to rotate by the corresponding side first main body wheel 121.

The two first main body wheels 121 may be gears that are engaged with each other. The two second main body wheels 122 may also be gears, that is, the first extrusion wheel 110 and the second extrusion wheel 120 are duplex gears. Through the arrangement, the two extrusion wheels 110, 120 can not only rotate synchronously in opposite directions to ensure a large extrusion force, but also maintain a certain gap between the two extrusion wheels 110, 120 to achieve the conveying of consumable. In other embodiments, the two second main body wheels may be rubber wheels, and the conveying of the consumable is achieved through the friction between the two rubber wheels and the consumable.

In an embodiment, the driving assembly 200 includes a driving member 210 and a driving gear 220 connected to the driving member 210. The driving member 210 is configured to drive the driving gear 220 to rotate. The extrusion device 10 further includes a transmission wheel 500. The transmission wheel 500 includes a third main body wheel 510 and a fourth main body wheel 520 that are coaxially connected. The third main body wheel 510 is engaged with the driving gear 220 for transmission, and a number of teeth of the third main body wheel 510 is greater than a number of teeth of the driving gear 220. The fourth main body wheel 520 is engaged with the first main body wheel 121 for transmission.

That is, the driving gear 220 is a small gear, and the third main body wheel 510 is a big gear. A two-stage deceleration mechanism is formed between the driving gear 220 and the third main body wheel 510, so that the extrusion force of the two extrusion wheels 110, 120 can be increased, the conveying capacity of the consumable can be improved, and the reliability of conveying material can be ensured. The driving member 210 adopts a small stepping motor, which can not only reduce the weight of the driving member 210, but also reduce the space occupied by the driving member 210, so that the entire extrusion device 10 is lighter and the layout is more reliable.

As shown in FIG. 3, ends of the two extrusion wheels 110, 120 are further sleeved with bearings 700, and an end of the transmission wheel 500 are also sleeved with a bearing 700. By providing the bearing 700 to support the corresponding moving component, an axial center position of the moving component is fixed, and the noise generated by the sliding friction during rotation of the moving component is reduced.

As shown in FIG. 2, FIG. 6 and FIG. 8, in an embodiment, the toggle member 400 is provided with a first avoidance notch 470, so that the toggle member 400 is in a substantially C-shape. An avoidance space is formed by providing the first avoidance gap 470 for the driving gear 220 and the transmission wheel 500 to extend through, so that the overall layout of the device is more compact and reasonable.

As shown in FIG. 3 and FIG. 8, further, the positioning assembly 300 is a rectangular plate, and the positioning assembly 300 is provided with a second avoidance notch 330, so that the toggle member 400 is substantially in a C-shape. Through the cooperation of the first avoidance notch 470 and the second avoidance notch 330, the driving gear 220 and the transmission wheel 500 can be located in a space formed by the two avoidance notches, and the overall layout of the device is more compact and reasonable.

In other embodiments, the toggle member 400 may be a U-shaped plate, and the second sliding groove 411 is provided at a bottom portion of the U-shaped plate. The first connecting member 312 and the second locking portion 420 are provided on two side walls of the U-shaped plate, respectively. The positioning assembly 300 may be an L-shaped plate, including a horizontal section and a vertical section. The second connecting member 311 is provided on the vertical section and is configured to rotationally cooperate with the second sliding groove 411. The first connecting member 312 is provided on the horizontal section and is configured to rotationally cooperate with the first sliding groove 431.

In other embodiments, when a deceleration mechanism is not required, the driving member may be directly engaged with one of the two first main body wheels, so as to transmit power to the two extrusion wheels 110, 120 to realize the conveying of the consumable.

As shown in FIG. 2, the toggle member 400 includes a handle 460, and the handle 460 is provided with anti-skid pattern. When the operator holds the handle 460, the anti-skid pattern can increase the contact friction between the operator and the toggle member 400, so that the operator can more easily drive the toggle member 400 to rotate, which can prevent skidding, and improve the smoothness of operating the toggle member 400.

As shown in FIG. 2, FIG. 3 and FIG. 9, in an embodiment, the positioning assembly 300 includes a fixing base 320 and a positioning plate 310 provided on the fixing base 320. The toggle member 400 is located between the positioning plate 310 and the fixing base 320 and is rotatably connected to the positioning plate 310. The first locking portion 321 is provided on the fixing base 320.

The fixing base 320 and the positioning plate 310 may be connected by fasteners such as pins or bolts. The positioning plate 310 is provided with a connecting shaft, and an end of the connecting shaft extends through the fixing base 320 and is configured for mounting the first extrusion wheel 110. The positioning plate 310 is provided with a second connecting member 311, and the second connecting member 311 extends through the toggle member 400, so that the toggle member 400 is rotatably connected to the positioning assembly 300. The first locking portion 321 is provided on the fixing base 320, so as to lock and limit the toggle member 400 in the open position or the closed position. The second connecting member 311 and the first locking portion 321 are provided on two components, respectively, so that the reliability of the rotation and locking process is improved, and the independent control is facilitated.

As shown in FIG. 8 and FIG. 9, in an embodiment, the fixing base 320 is provided with an avoidance groove 322. At least a portion of the toggle member 400 is located in the avoidance groove 322 and can rotate in a space formed by the avoidance groove 322. When the toggle member 400 is located in the open position, the toggle member 400 abuts against a groove wall of the avoidance groove 322. That is, by providing the avoidance groove 322, on the one hand, the overall space occupied by the fixing base 320 and the toggle member 400 as a whole along an axial direction can be reduced. On the other hand, the avoidance groove 322 can limit the moving space of the toggle member 400, so that the toggle member 400 can only move within a preset range, thereby ensuring the reliability of the toggle member 400 switching between the open position and the closed position.

Further, the fixing base 320 is further provided with a limiting column 323, and the limiting column 323 protrudes outward relative to the groove wall of the avoidance groove 322. When the toggle member 400 rotates to abut against the groove wall of the limiting groove, the toggle member 400 abuts against the limiting column 323 at the same time. Since the limiting column 323 is protruded relative to the groove wall of the avoidance groove 322, the risk that the toggle member 400 slides out of the avoidance groove 322 along the groove wall of the avoidance groove 322 can be reduced, and the limiting effect on the toggle member 400 can be improved, so that the toggle member 400 can be kept in the open position, and the reliability of the toggle member 400 switching to the closed position can be ensured.

As shown in FIG. 1 and FIG. 2, in an embodiment, the extrusion device 10 further includes a cover 630 connected to a side of the fixing base 320 away from the toggle member 400. By providing the cover 630, internal moving components such as the two extrusion wheels 110, 120 can be effectively, so as to prevent sundries and dust from entering and ensure the operation reliability of the moving components.

As shown in FIG. 1 and FIG. 3, in yet another embodiment, the extrusion device 10 further includes a claw 610 and a buckle 620 which are engaged with each other. The cover 630 is provided with a guide hole 631 extending therethrough. An end of the claw 610 extends into the guide hole 631 through the buckle 620. The claw 610 is provided with a through hole, and the through hole and the guide hole 631 form a guide space for allowing the consumable to pass through and guiding the consumable, thereby improving the straightness of the consumable during conveying and reducing the risk of the consumable not being able to enter a printing nozzle well due to poor straightness.

Further, the present disclosure further provides a 3D printing device, including any one of the aforementioned embodiments of the extrusion device 10. Since the 3D printing device has the aforementioned extrusion device 10, when the consumable need to be replaced, the toggle member 400 is operated to move to the open position, so that the second extrusion wheel 120 moves away from the first extrusion wheel 110, the feeding gap 130 between the second extrusion wheel 120 and the first extrusion wheel 110 is increased, and the two extrusion grooves are separated from extruding the consumable, thereby realizing the replacement or feeding of the consumable. When the toggle member 400 is operated to move to the closed position, the second extrusion wheel 120 approaches the first extrusion wheel 110, and the feeding gap 130 between the second extrusion wheel 120 and the first extrusion wheel 110 is reduced, so that the consumable is extruded and conveyed, and the consumable is replaced more conveniently and efficiently. There is no need to provide a spring pressing extrusion wheel, so that the problem that the extrusion force between the two extrusion wheels 110, 120 is changed due to the deformation of the spring can be avoided, the extrusion force provided by the two extrusion wheels 110, 120 is relatively stable and reliable, the risk of material planing and material breakage is reduced, and the material conveying reliability and use stability of the extrusion device 10 are improved.

The above-mentioned embodiments do not constitute a limitation on the protection scope of the technical solution. Any modifications, equivalent replacements and improvements made within the spirit and principles of the above-mentioned embodiments shall be included within the protection scope of this technical solution.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure. Therefore, the protection scope of the present disclosure shall be subject to the protection scope of the appended claims.

What is claimed is:

1. An extrusion device configured to convey a 3D printing consumable, comprising:

an extrusion assembly comprising a first extrusion wheel and a second extrusion wheel, wherein a feeding gap allowing a consumable to pass through is formed between the first extrusion wheel and the second extrusion wheel;

a driving assembly in transmission connection with the extrusion assembly and configured to drive the first extrusion wheel and the second extrusion wheel to rotate in opposite directions; and a switching mechanism comprising a positioning assembly and a toggle member rotatably connected to the positioning assembly, wherein the first extrusion wheel is mounted on the positioning assembly, the second extrusion wheel is mounted on the toggle member, the toggle member has an open position and a closed position, the toggle member is configured to be operably rotated to switch between the open position and the closed position to drive the second extrusion wheel to approach or move away from the first extrusion wheel, so as to reduce or increase the feeding gap, wherein the positioning assembly comprises a first locking portion, the toggle member comprises two second locking portions that are spaced apart, when the toggle member rotates to the open position, the first locking portion is engaged with one of the two second locking portions; and when the toggle member is rotated to the closed position, the first locking portion is engaged with another of the two second locking portions.

2. The extrusion device according to claim 1, wherein the toggle member comprises a first limiting portion, the positioning assembly comprises a first connecting member located in the first limiting portion, during rotation of the toggle member relative to the positioning assembly, the first connecting member moves in the first limiting portion.

3. The extrusion device according to claim 2, wherein the first extrusion wheel is mounted on the first connecting member, the second extrusion wheel is mounted on a mounting shaft of the toggle member, when the toggle member is located in the closed position, the mounting shaft and the first connecting member are collinear in a horizontal direction.

4. The extrusion device according to claim 2, wherein one of the positioning assembly and the toggle member comprises a second limiting portion, another one of the positioning assembly and the toggle member comprises a second connecting member located in the second limiting portion, during the rotation of the toggle member relative to the positioning assembly, the second connecting member moves in the second limiting portion.

5. The extrusion device according to claim 4, wherein the first limiting portion is a first sliding groove, the second limiting portion is a second sliding groove, and an angle is formed between an extending direction of the first sliding groove and an extending direction of the second sliding groove.

6. The extrusion device according to claim 5, wherein the first sliding groove and the second sliding groove are located at both ends of the toggle member, and the first sliding groove and the second sliding groove are not collinear in both a horizontal direction and a vertical direction.

7. The extrusion device according to claim 1, wherein one of the first locking portion and one of the two second locking portions is a bead positioning pin, another one of the first locking portion and one of the two second locking portions is a first positioning hole, and the bead positioning pin is engaged with the first positioning hole.

8. The extrusion device according to claim 1, wherein the positioning assembly comprises a fixing base and a positioning plate provided on the fixing base, the toggle member is located between the positioning plate and the fixing base and is rotatably connected to the positioning plate, and the first locking portion is provided on the fixing base.

9. The extrusion device according to claim 1, wherein the first extrusion wheel and the second extrusion wheel each comprises a first main body wheel and a second main body wheel that are coaxially connected, two first main body wheels are engaged for transmission, one of the two first main body wheels is connected to the driving assembly, the feeding gap is formed between two second main body wheels, and each second main body wheel is driven to rotate by the corresponding first main body wheel.

10. The extrusion device according to claim 9, wherein the driving assembly comprises a driving member and a driving gear connected to the driving member, the driving member is configured to drive the driving gear to rotate, the extrusion device further comprises a transmission wheel, the transmission wheel comprises a third main body wheel and a fourth main body wheel that are coaxially connected, the third main body wheel is engaged with the driving gear for transmission, a number of teeth of the third main body wheel is greater than a number of teeth of the driving gear, and the fourth main body wheel is engaged with the first main body wheel connected to the driving assembly for transmission.

11. A 3D printing device, comprising the extrusion device according to claim 1.

12. An extrusion device configured to convey a 3D printing consumable, comprising:

an extrusion assembly comprising a first extrusion wheel and a second extrusion wheel, wherein a feeding gap allowing a consumable to pass through is formed between the first extrusion wheel and the second extrusion wheel;

a driving assembly in transmission connection with the extrusion assembly and configured to drive the first extrusion wheel and the second extrusion wheel to rotate in opposite directions; and a switching mechanism comprising a positioning assembly and a toggle member rotatably connected to the positioning assembly, wherein the first extrusion wheel is mounted on the positioning assembly, the second extrusion wheel is mounted on the toggle member, the toggle member has an open position and a closed position, the toggle member is configured to be operably rotated to switch between the open position and the closed position to drive the second extrusion wheel to approach or move away from the first extrusion wheel, so as to reduce or increase the feeding gap, wherein the first extrusion wheel and the second extrusion wheel each comprises a first main body wheel and a second main body wheel that are coaxially connected, two first main body wheels are engaged for transmission, one of the two first main body wheels is connected to the driving assembly, the feeding gap is formed between two second main body wheels, and each second main body wheel is driven to rotate by the corresponding first main body wheel, and wherein the driving assembly comprises a driving member and a driving gear connected to the driving member, the driving member is configured to drive the driving gear to rotate, the extrusion device further comprises a transmission wheel, the transmission wheel comprises a third main body wheel and a fourth main body wheel that are coaxially connected, the third main body wheel is engaged with the driving gear for transmission, a number of teeth of the third main body wheel is greater than a number of teeth of the driving gear, and the fourth main body wheel is engaged with the first main body wheel connected to the driving assembly for transmission.

* * * * *